United States Patent [19]

Davies et al.

[11] 4,241,791

[45] Dec. 30, 1980

[54] METHOD FOR DIVERTING A GASEOUS SAND-CONSOLIDATING FLUID

[75] Inventors: David R. Davies, Rijswijk, Netherlands; Edwin A. Richardson, Houston, Tex.

[73] Assignee: Shell Oil Company, Houston, Tex.

[21] Appl. No.: 117,697

[22] Filed: Feb. 1, 1980

[30] Foreign Application Priority Data

Jun. 26, 1979 [GB] United Kingdom ............... 79222/79

[51] Int. Cl.³ ...................... E21B 33/138; E21B 43/02
[52] U.S. Cl. .................................... 166/292; 166/288; 166/300
[58] Field of Search ............... 166/281, 288, 292, 300

[56] References Cited

U.S. PATENT DOCUMENTS

| | | | |
|---|---|---|---|
| 2,019,908 | 11/1935 | Kennedy et al. | 166/292 |
| 2,469,354 | 5/1949 | Bond | 166/292 X |
| 2,808,886 | 10/1957 | Bail et al. | 166/292 X |
| 3,087,542 | 4/1963 | Becker et al. | 166/292 |
| 3,090,435 | 5/1963 | Kerver et al. | 166/292 X |
| 3,221,505 | 12/1965 | Goodwin et al. | 166/292 X |
| 3,252,513 | 5/1966 | Holmes | 166/292 X |
| 4,061,191 | 12/1977 | Meijs et al. | 166/292 |

*Primary Examiner*—James A. Leppink
*Assistant Examiner*—George A. Suchfield

[57] ABSTRACT

An unconsolidated gas-producing sand in which the permeability is layered and the productivity can be impaired by liquid blocking can be consolidated by wetting the rock surfaces with a limited amount of water, injecting a smoke which selectively reduces the permeability of the most permeable layers by depositing on their faces unconsolidated masses of substantially inert solid particles and injecting a gaseous silicon polyhalide to convert a significant proportion of the rock surface-wetting-water to a grain bonding silica gel.

6 Claims, No Drawings

METHOD FOR DIVERTING A GASEOUS SAND-CONSOLIDATING FLUID

BACKGROUND OF THE INVENTION

This invention relates to consolidating an unconsolidated gas-producing sand in which the permeability is layered and the productivity can be impaired by liquid blocking. More particularly, the invention relates to an improved procedure for consolidating such a sand by the process described in the F. H. Meijs and D. R. Davies U.S. Pat. No. 4,061,191. That method relates to consolidating an unconsolidated gas reservoir by treating it to the extent required to ensure the presence of a significant but small amount of water absorbed on the rock surfaces then injecting enough gaseous silicon polyhalide to convert enough of that water to a grain-bonding silica gel to increase the competency without significantly reducing the permeability. The disclosures of the U.S. Pat. No. 4,061,191 patent are incorporated herein by cross reference.

As indicated in the U.S. Pat. No. 4,061,191 patent, numerous procedures have been proposed for utilizing liquid or gaseous silicon polyhalides in a treatment of subterranean reservoirs. For example, U.S. Pat. No. 2,019,908 discloses plugging a subterranean formation by injecting a nonaqueous silicon polyhalide and then allowing water to infuse and react. U.S. Pat. No. 2,469,354 teaches that a gas drive oil recovery process can be improved by injecting a gas which contains a halosilane and causes an oil-wetting of the rocks and/or plugging of a thief zone. U.S. Pat. No. 2,633,919 teaches that a reservoir can be oil-wetted by injecting a nonaqueous liquid containing a hydrocarbon-substituted silicon halide and then injecting water to hydrolyze the adsorbed halide. U.S. Pat. No. 2,808,886 teaches that a gas drive oil recovery process can be improved by including vapors of volatile hydrolyzable inorganic liquid and water in the gas to form permeability controlling or water-layer-plugging solid metal oxides or silica gels. U.S. Pat. No. 3,055,425 teaches that a reservoir can be consolidated and stabilized by injecting a nonaqueous liquid containing a silicon halide and then heating the treated zone to above about 300° F. U.S. Pat. No. 3,087,542 teaches that a water-bearing formation can be plugged by injecting gaseous silicon tetrafluoride to finger through the water and form a radially extensive plug. U.S. Pat. No. 3,090,435 teaches that by injecting a water-in-oil emulsion followed by a nonaqueous liquid containing a silicon halide, an unconsolidated reservoir can be consolidated. U.S. Pat. No. 3,221,505 teaches that a barrier plug can be formed by injecting a water-miscible liquid followed by a gaseous silicon tetrachoride to form a plug along the interface between it and the water. U.S. Pat. No. 3,252,513 teaches that water can be excluded from a well being gas drilled by injecting aqueous ammonia into a water producing carbonate reservoir ahead of an oil solution of silicon tetrachloride.

SUMMARY OF THE INVENTION

In accordance with the present invention, a gas reservoir which has a layered permeability and is susceptible to impairment by liquid-blocking is consolidated and/or strengthened by the following steps. The reservoir water content is adjusted to the extent necessary to wet the surfaces of the rock with a significant but small proportion of water. The reservoir injectivity is adjusted by injecting a permeability-adjusting smoke in which both the particles and the particle-suspending gas are substantially inert with respect to hydrolyzing silicon polyhalide at the temperature of the reservoir. The permeability-adjusting smoke is injected so that unconsolidated masses of substantially dry solid particles are screened out on the faces of the layers within the reservoir in a manner causing the most permeability impairment along the most permeable layers. The interiors of the so-treated layers are then consolidated by injecting a gaseous silicon polyhalide, having a water reactivity substantially equivalent to that of gaseous silicon tetrachloride, so that a significant proportion of the water that wets the rock surfaces is converted to a grain bonding silica gel. The permeability-adjusting smoke particles are subsequently removed by producing fluid from the reservoir.

In a preferred embodiment, such a permeability-adjusting smoke is both substantially inert with respect to hydrolyzing silicon tetrachloride and consists essentially of dispersed particles of the group consisting of ammonium chloride and oxides of titanium, silicon, or tin.

The expression "gas-containing underground formation" as used in the present specification and claims relates to an underground formation of which at least those parts of the pore space thereof surrounding the well contain a continuous volume of gas from which a production of gas can be obtained. This gas may be gas that is already present in the formation, or present in the formation as a result of recovery methods carried out prior to the present consolidating treatment, or has been injected into the formation prior to carrying out the present treatment in order to displace oil and/or water or any other fluid from at least those parts that are to be consolidated.

The expression "waterwet pore space walls" as used in the present specification and claims relates to the reservoir rock surfaces or pore space walls that are preferentially wetted by water and have a thin layer of water present on them, at least in the form of generally ring-shaped water layers in capillary openings around the contact points between adjacent grains or particles of the formation. If no rock-wetting water is present prior to carrying out the present consolidating treatment, such water is supplied to the walls of the pore space in a suitable manner, such as by injecting a mist of water particles into the pore space by means of a carrier gas. If necessary, the pore walls may be made water-wettable by a suitable pre-treatment known per se.

During the consolidating treatment according to the present invention, the gaseous silicon halogen compound, such as silicon tetrachloride, reacts with the rock-wetting water adhering to the walls of the pore spaces, thereby forming amorphous silica that bonds the formation grains together. Since substantially dry particles of nonaqueous composition are used for selectively plugging or obstructing the reservoir faces or entrances to the pore spaces of the layers of inhomogeneous permeability, those particles do not become bonded together and/or to the walls of the formation grains to be consolidated. The dry particles of the plugging materials will therefore be removed from the well when the well is brought into production after the treatment.

The expression "selectively obstructing" as used in the present specification and claims refers to the step or steps of obstructing the face or entrance to the pore space of a relatively high-permeable layer to a greater extent than that of a relatively low-permeable layer. As known to those skilled in the art where such layers are in fluid communication with each other through a portion of a wellbore and/or a conduit within a wellbore, a relatively low permeability layer behaves as though it requires a relatively high injection pressure; in the sense that, in order to inject a gaseous fluid into the less permeable layer, a greater pressure is required than is required to obtain a similar rate of injection into a more permeable layer.

In present process the distribution of a consolidating agent over the various layers of a formation to be treated is considerably improved by injecting a smoke of particles of non-aqueous composition. These particles are carried to and screened-out on faces or entrances of the formation layers by a gaseous fluid which flows preferentially into the layers having the highest permeability. As a result of this the largest amounts of the particles will be deposited on the faces of the most permeable layers. When such particles have partially obstructed the entrance to the more permeable layers, less of the gaseous fluid flows into those particular layers while more is flowing into the layers of lower permeability. Thus, particle-carrying gaseous fluid or any other gaseous fluid that is subsequently injected into the formation layers will be more evenly distributed over the various layers. Thus, when a sand-consolidating gaseous silicon halogen compound is injected either simultaneously or alternatively with a gas carrying particles of nonaqueous composition, such a procedure results in a more even distribution of the consolidating fluid within the pore spaces of the various layers of the formation.

A determination of whether enough of the pore-plugging smoke has been injected can be made by noting whether a significant increase has been made in the injection pressure needed to maintain a given rate of flow or a significant decrease has occurred in the rate of flow that is caused by a given injection pressure. More smoke can be injected if needed to induce a selected extent of change. Or, more fluid can be backflowed if needed to reduce an undesirably large extent of change. Methods and devices for effecting such determination and corrections are readily available to those skilled in the art.

In a preferred embodiment, the permeability-adjusting smokes are dispersions of substantially dry metal oxide particles in an inert gas which is substantially dry (e.g., containing less than about 1% by weight of water) when it enters the reservoir to be treated. Smokes of metal oxide particles and a process for making them are described in U.S. Pat. No. 2,808,886, relating to their use in a gas being injected in a gas drive oil recovery process. In the patented process volatile, hydrolyzable, inorganic liquids (such as the tetrachlorides of silicon titanium or tin) are positioned within a gas injection well so that they were vaporized in a stream of "wet gas" being injected into the reservoir. The patent teaches that the specified tetrachlorides react with the water in the gas to yield metal oxides, hydrogen chloride and water. It also teaches that the resulting improvement in oil recovery may be due to both a deposition of solid metal oxide particles in the most permeable strata and the formation of gelatinous precipitates that prevent water from seeping into the production well. In the forming of such metal oxide smokes for use in the present invention, care must be taken to ensure that substantially all the water present in the "wet gas" is used up in the formation of the metal oxides so that the resultant smoke becomes a dispersion substantially dry particles within a substantially dry gas and thus becomes a smoke which is substantially inert with respect to hydrolyzing a silicon polyhalide at the temperature of the reservoir.

The gaseous silicon halogen compound used for consolidation of the grains or particles of the formation layers may be injected via the well simultaneously with the carrier gas carrying the nonaqueous particles for selectively obstructing the entrances to the pore spaces of the formation layers, or may be injected via the well separate from the said carrier gas. In a third manner, the gaseous silicon halogen compound is continuously injected over a predetermined time interval, but nonaqueous particles are supplied from time to time to the gaseous compound during this interval. It will be appreciated that the gaseous silicon halogen compound may be diluted by mixing the compound with a dry inert gas. This gas may be the same as the carrier gas used for transporting the nonaqueous particles down the well.

By the expression "injectivity of a formation layer" used in the present specification and claims is to be understood the rate of fluid injection per standard unit of differential pressure exerted at the wall of the well where the fluid enters the layer.

EXAMPLE I

Assume that the reservoir to be treated is an unconsolidated gas-productive formation at 100° C. that contains layers having several different permeabilities. Such a reservoir may be penetrated by a well completed over a production interval of about 25 meters. The formation pore space may contain natural gas at about 200 bars pressure (i.e., about 2900 psig). The amount of liquid phase water which is present in the reservoir, at grain contacts and along the walls of the pores, may occupy about 15% by volume of the reservoir pore space.

A gas capable of becoming a dispersion of fine solid particles is supplied via the well to the reservoir to be treated. This gas may consist of a mixture of equal volumes of $N_2$ gas saturated with a 10% w solution of ammonia in water and $N_2$ gas saturated with $SiCl_4$ vapor, at 100° C. and 200 bars. The following chemical reactions take place during the interval of time that such a gas is being pumped down through the well and into the reservoir to be treated:

$$SiCl_4(g) + H_2O(g) \rightarrow SiOCl_2(g) + 2HCl(g) \text{ or}$$

$$SiCl_4(g) + 2NH_3(g) \rightarrow Si(NH)_2(g) + 4HCl(g)$$

$$HCl(g) + NH_3(g) \rightarrow NH_4Cl(s)$$

where (g)=gas, and (s)=solid phase.

The so-formed $NH_4Cl$ particles have a relatively small size (in the range of 100 μm) and are deposited on the entrances to the pore spaces of the various layers of the reservoir. The leading part of the volume of gas carrying the particles will enter the layers with the largest permeability while depositing the solid particles on the faces or entrances of those layers. This restricts the injectivities of those layers to values at which part of the carrier gas is diverted to layers within initially had a lower injectivity. The injectivity of latter layers are also gradually decreased, at slower rates due to the slower flows into them, with the flow of carrier gas being further diverted to other layers, until the injectivities of all the layers have become substantially equal.

The injection of the particle-generating gas composition can be followed by an injection of a consolidating gas composition consisting of nitrogen gas containing SiCl₄ in an amount equal to about 25% of the saturation volume thereof at 100° C. and 200 bars. This gas composition will–on entering the formation—be evenly distributed within the various layers of the reservoir, as the effective injectivities of those layers have now become substantially equal as a result of the particles deposited on them.

Thus, the sand consolidating gas composition will penetrate over substantially equal distances within the various layers. And, the gaseous silicon tetrachloride will react as follows with the liquid water present near the grain contacts and on the walls of the pores within the various layers:

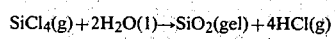

$$SiCl_4(g) + 2H_2O(l) \rightarrow SiO_2(gel) + 4HCl(g)$$

where (l) = liquid phase. The SiO₂(gel) or amorphous silicon dioxide which is so-formed bonds the particles of the layers together. And, the various layers will be consolidated along substantially equal distances from the well.

After the consolidating treatment, such a well may be brought into production. The fluid produced from the well will sweep away the particles deposited on the entrances of the pore spaces of the various layers.

EXAMPLE II

A series of alternating slugs of sand consolidating and flow-diverting gases can be injected into a reservoir of the type described in Example I.

A gas composition consisting of nitrogen gas comprising SiCl₄ in an amount equal to 50% of the saturation volume thereof at 100° C. and 200 bars can be flowed into the reservoir at a relatively high rate, so that some enters each formation layer. The relative amounts of gas flowing into the layers are determined by the relative permeabilities of the various layers.

After an initial consolidation step, wherein about 25% of the total amount of SiCl₄ to be used for the consolidation treatment has been injected into the well, a diversion step may be carried out by flowing a particle-forming gas mixture similar to the mixture described in Example I through the well and into the total interval to be treated. This injection can be continued until a desirable rise in injection pressure occurs due to formation plugging by the particles screened-out along its face (as described in Example I).

Such steps of consolidation and diversion are then repeated until the total amount of SiCl₄ has been injected.

EXAMPLE III

The flow-diverting, particle-generating gas composition of Examples I and II can be replaced by a gas composition consisting of nitrogen gas saturated with titanium tetrachloride and water vapor. During the passage of such a composition through the well, titanium dioxide particles of 100 μm or smaller are generated and are deposited on the entrances to the pore space of the various formation layers. A dry gas is preferably injected immediately behind such a particle-generating gas composition, in order to remove any liquid water that might have been adsorbed on those particles or the faces of the various layers.

As described in the U.S. Pat. No. 4,061,191 patent, silicon polyhalides other than SiCl₄, such as silicon hexachloride, silicon octachloride, the silicon fluorides either separately or in mixtures may be used in the consolidating treatments according to the invention. The consolidating agents may be present in the carrier gas in volumes that are in the range of 1-100% of the saturation volume of the polyhalide at the formation temperature and injection pressure. Additional amounts of the polyhalide may be supplied in the form of a fine mist when desired to supplement the solid-particle-effected selective plugging of the entrances of the formation layers.

Any carrier gas suitable for the purpose (that is inert or compatible with the chemicals used, the materials of the well equipment, the formation materials and the fluids present in the formation) may be used instead of the nitrogen carrier gas referred to in the Examples. In particular, reference is made in this respect to natural gas produced near the treatment site, such as the gas that has been produced earlier from the formation to be treated. This natural gas is preferably stored in an amount sufficiently large for carrying out a subsequent consolidating treatment according to the invention. Also, natural gas obtained from neighboring wells penetrating the same or other formation layers as the well to be treated may be used. This gas after being recovered may be treated in a continuous process prior to be injected into the well penetrating the formation layers that are to be consolidated. Other suitable gases are methane and argon. As indicated in the U.S. Pat. No. 4,061,191 patent, the carrier gas should contain not more than about 1% by weight of water and preferably contains less than about 0.05%. In the present process, the carrier gas should be substantially free of liquid water. However, the carrier gas may contain water in the vapor form, since water vapor has been found not to form undesirable raction products when contacted by the silicon halogen consolidating agent present in the carrier gas and/or the smoke particle diverting agents in that gas and/or on the face of the reservoir.

Although the silicon polyhalide has in all the above Examples been injected in gaseous form into the wells to be treated, it will be appreciated that in an alternative scheme, it may be passed down the well in liquid form via a tubular (such as a macaroni string or coiled tubing) different from the one through which a carrier gas is passed down to the level of the layers to be consolidated. At the required level of the well, the polyhalide is mixed with the carrier gas (preferably by being atomized by means of a spray nozzle). The polyhalide then vaporizes completely or partially before entering the formation layers.

It will be appreciated that in case the formation parts to be treated contain an amount of water adhering to the walls of the pore spaces, which amount of water is not considered sufficient for obtaining the desired compressive strength after consolidation, this deficiency of water may be made up by injecting a volume of a super-saturated wet gas, that is gas containing a certain amount of water in the form of extremely small droplets.

If the formation contains an exceptionally high water content which would lead to an unnecessary large permeability reduction on consolidation, then this water content may be reduced by injecting a sufficiently large amount of dry gas, preferably heated gas, into the formation parts. As indicated in the U.S. Pat. No. 4,061,191 patent the water content of the formation is preferably from about 3-7% by weight of the fluid in the formation.

In case the pore spaces of the formation parts to be treated contain an undesired amount of gas condensate, this condensate may be removed by injecting dry gas into said formation parts. If necessary, after such a condensate removal, the required amount of water in the formation pore spaces can be re-established by injecting a supersaturated wet gas, as indicated above.

What is claimed is:

1. A process, for consolidating or strengthening a gas-containing reservoir which has a layered permeability and is susceptible to impairment by liquid-blocking, comprising:

adjusting the water content of said reservoir to the extent necessary to wet the surfaces of the rock with a significant but limited amount of water;

injecting into the reservoir a sand consolidating gaseous solution which consists essentially of vapors of a silicon polyhalide, which has a water reactivity substantially equaling that of silicon tetrachloride, mixed with inert gas and is capable of causing a significant proportion of the rock-wetting water to be converted to a grain-bonding silica gel;

injecting, immediately ahead of at least a significant proportion of said sand consolidating gaseous solution, a permeability-adjusting smoke in which both the solid particles and the particle-suspending gas are substantially dry and are inert with respect to the hydrolyzing of a silicon polyhalide, at the temperature of the reservoir, with said smoke being injected so that most of the smoke particles are screened-out, in the form of permeability-impairing masses, along the faces of the more permeable layers of the reservoir; and, subsequently removing said permeability-impairing masses of smoke particles by producing fluid from the reservoir.

2. The process of claim 1 in which said smoke consists essentially of a dispersion of solid particles of the group consisting of ammonium chloride, and oxides of titanium, silicon or tin.

3. The process of claim 1 or 2 in which the injection pressure at which fluids are injected into the reservoir is kept at least substantially as high as that required to inject the initial portion of said smoke throughout substantially all of the injection of the remaining portion of the smoke and the injection of said significant proportion of sand consolidating solution.

4. The process of claim 3 in which the amount of said permeability-adjusting smoke which is injected is adjusted to the extent required to cause a selected extent of change in the injectivity of the reservoir by injecting additional smoke or backflowing fluid from the reservoir to the extent required to cause selected increase in the injection pressure required to maintain a given rate of injection or a selected decrease in the rate of injection which results from a given injection pressure.

5. The process of claim 1 or 2 in which a substantially dry gas is circulated within the borehole to remove substantially all liquid water from the conduits and borehole wall prior to the injecting of the sand consolidating gaseous solution for the permeability-adjusting smoke.

6. The process of claim 1, 2, 3 or 4 in which the permeability-adjusting smoke contains particles of ammonium chloride.

* * * * *